June 28, 1960
C. A. CROW
2,942,822
HOLDER FOR A LAWN HOSE
Filed July 22, 1958
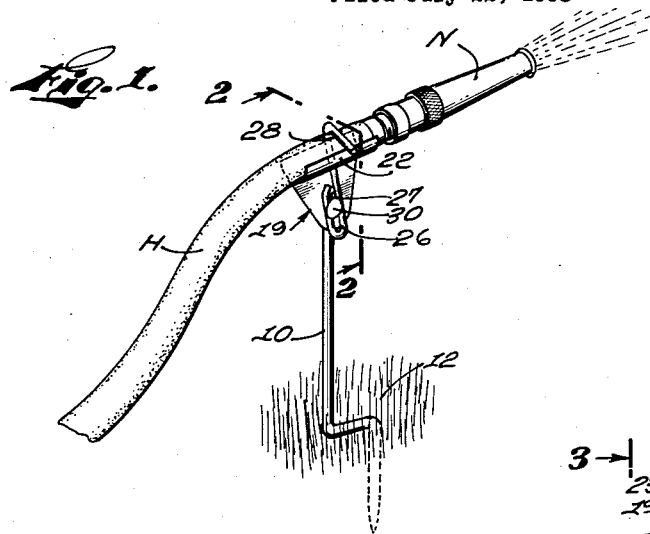
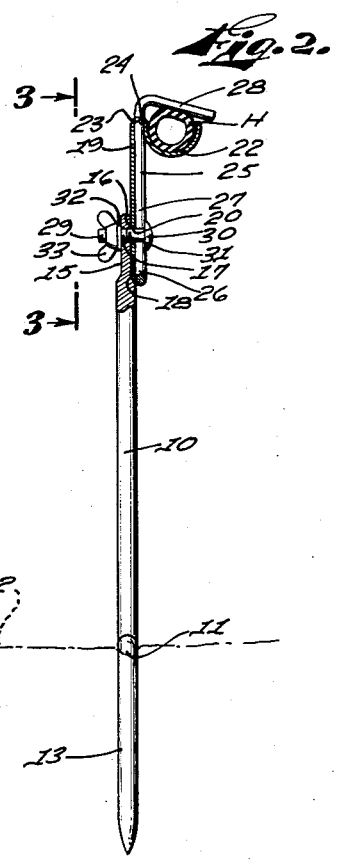
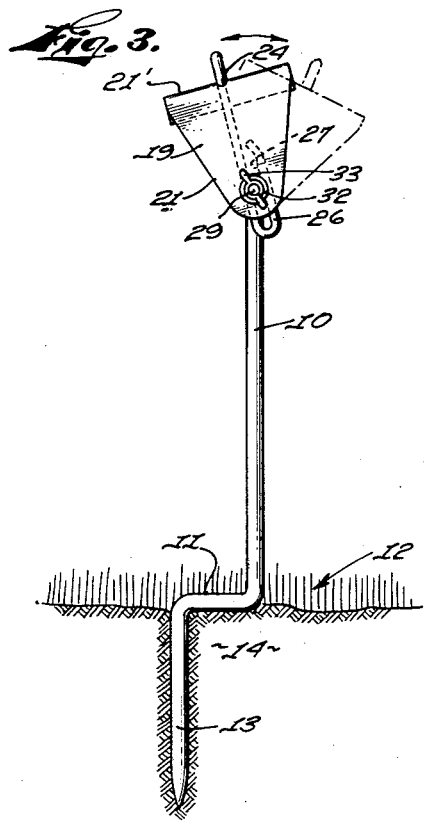
INVENTOR
CLINTON A. CROW
BY FULWIDER, MATTINGLY & HUNTLEY
ATTORNEY

United States Patent Office 2,942,822
Patented June 28, 1960

2,942,822

HOLDER FOR A LAWN HOSE

Clinton A. Crow, 26001 Narbonne Ave., Lomita, Calif.

Filed July 22, 1958, Ser. No. 750,189

3 Claims. (Cl. 248—88)

This invention relates generally to hose supports and more particularly to an adjustable device that mechanically simulates the normal hand watering operation.

One of the main objects of the invention is to provide a mechanical support for the end of a lawn or garden hose so that manual adjustment to simulate normal hand watering and nozzle adjusting operations may be made without removal of the nozzle from the support.

Prior devices of various kinds have been used to mechanically support the ordinary garden hose. Adjustable supports for the hose nozzles have also been provided.

The prior devices may be considered reasonably satisfactory for use but they fail entirely in the exact simulation of the hand watering and nozzle adjusting operations.

Another object of the invention is to provide a hose support that lends itself to simple manual adjustment which permits universal directional watering operations simulating hand movement and at the same time permitting desired adjustment of the nozzle.

Still another object of the invention is to provide universal adjustment and trough support of the end of the conventional lawn hose in connection with a foot operated positioning tang.

A still further object of the invention is in the provision of a tiltable hose trough and adjustable clamp in connection with a positioning rod that permits substantial mechanical simulation of the usual hand watering and nozzle adjusting operations.

With the foregoing objects in view, and such other objects and advantages as will become apparent to those skilled in the art to which this invention relates as this specification proceeds, the invention consists essentially in the arrangement and construction of parts all as hereinafter described, reference being had to the accompanying drawing in which:

Figure 1 is a perspective view of the hose and support in operative position;

Figure 2 is an elevational view partially in section taken on the line 2—2 of Figure 1; and Figure 3 is an elevational view taken on the line 3—3 of Figure 2.

Referring to the drawing, a positioning rod 10 has an offset or deflected base 11 which provides foot actuating means for inserting the rod 10 in an adjustable but stable manner in the conventional lawn 12. An integrally formed tang 13 depends a sufficient distance into the earth 14 to provide proper support for the hose supporting mechanism. The upper end of the rod 10 is flattened at 15 and 16 for the drilling of a hole 17 therein.

The flattened portion 16 provides increased frictional engaging surface between the rod 10 and an inner lower end surface 18 of a hoe bracket 19. The bracket 19 is apertured at 20 and tapered upwardly at 21. The bracket 19 is then bent laterally on a line 21' to form an extended concave hose trough 22. A rounded ridge 23 remains between the bracket 19 and the hose trough 22. An aperture 24 is drilled or formed in the ridge 23 either before or after the bending operation and provides a vertically disposed clamping rod guide.

A hose clamping rod 25 has its lower end formed in the shape of a flattened loop 26 wwhich provides an elongated adjustment gap or groove 27. The upper end of the rod 25 passes through the guiding aperture 24 and is bent in a substantially right angular manner at 28 over the elongated hose trough 22.

Attachment and adjustment mechanism include a threaded carriage bolt 29. A head 30 on the bolt 29 engages the flattened loop 26 and a shoulder 31 thereof passes through the gap 27 as well as apertures 20 and 17 in bracket 19 and rod 10 respectively. A washer 32 and wing nut 33 on the carriage bolt 29 complete the adjusting and clamping assembly.

The operation of the device is simple. Assembly of the hose supporting elements by means of the carriage bolt 29 and wing nut 33 is believed obvious. The bolt 29 or rather the shoulder 31 thereof forms the axis or pivot about which the bracket 19 may be tilted as clearly shown in Figure 3. The headed bolt 29 and the shoulder 31 also provide a means upon which the flattened loop 26 of clamping rod 25 can be vertically adjusted to permit insertion of the hose and clamping of same in the elongated trough 22.

Any kind of adjustable hose nozzle N may be used because the outer end of a conventional hose H may be inserted laterally onto the trough 22 and beneath the clamping end 28 of the clamping rod 25. Manual release and tightening of the wing nut 33 permits tilting of the bracket 19 and hose N to any watering angle desired.

Positioning of the rod 10 in the earth is accomplished by manual withdrawal and foot insertion of the tang 13 to any radial position desired.

It is important in the use of this invention that mechanical simulation of the hand watering must also include quick adjustment of the nozzle N.

With the hose and clamp in the left hand of the operator, the hose may be directed properly for watering the desired spot or area. The operator's right hand is available for normal manual adjustment of the nozzle if necessary.

Direction of watering and nozzle adjustment made, the operator then positions the rod 10 by foot pressure at the correct angle and then adjusts the hose trough and bracket in the proper pivoted position. Obviously, the sequence of adjustment need not follow the above plan, but complete freedom to make nozzle adjustment at any time without hose repositioning is essential to simulation of the ordinary hand operation. Support of the hose end in the elongated trough permits clamping thereon without interfering with the normal passage of water therethrough.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A support for a lawn hose comprising: a positioning rod; an upwardly disposed bracket having an elongated hose trough tiltable on said rod; a clamping rod adjustably mounted on said rod and projecting through said bracket and over said trough; and a single manual adjusting means for simultaneously adjusting and securing said bracket and clamp.

2. A support for a lawn hose and nozzle comprising: a manually insertable positioning rod; a manually operated adjustment member in the upper end of said rod; an upwardly extending bracket pivotally mounted on said adjustment member, said bracket having an elongated hose trough formed on its upper end; and a clamp rod projecting through said bracket and over said hose trough, said clamping rod being supported for vertical positioning on said adjustment member.

3. A support for a lawn hose and nozzle comprising: a positioning rod having a foot actuated offset tang; a threaded attachment bolt having a wing adjustment nut carried in the upper end of said rod; a bracket pivoted on said bolt, said bracket having an elongated hose trough formed on its upper end; and a clamping rod projecting through said bracket and over said hose trough, said clamping rod having a flattened loop forming an adjustment groove on its lower end surrounding said bolt.

References Cited in the file of this patent

UNITED STATES PATENTS

| | | |
|---|---|---|
| 861,545 | Smith | July 30, 1907 |
| 1,123,900 | Leslie | Jan. 5, 1915 |
| 1,447,579 | Thomas | Mar. 6, 1923 |
| 1,537,237 | Kaestner | May 12, 1925 |
| 1,942,701 | Hilton | Jan. 9, 1934 |